June 14, 1960  A. H. REIDIES ET AL  2,940,823
PRODUCTION OF POTASSIUM MANGANATES
Filed Oct. 10, 1956
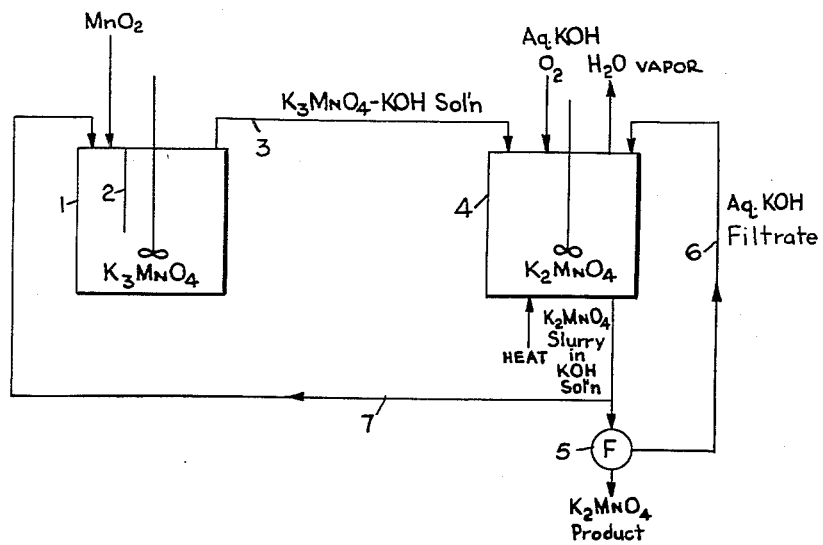
INVENTORS:
ARNO H. REIDIES
MILTON B. CARUS
BY
ATT'YS

United States Patent Office 2,940,823
Patented June 14, 1960

2,940,823
PRODUCTION OF POTASSIUM MANGANATES

Arno H. Reidies and Milton B. Carus, La Salle, Ill., assignors to Carus Chemical Company, La Salle, Ill., a corporation of Illinois Filed Oct. 10, 1956, Ser. No. 615,033

14 Claims. (Cl. 23—58)

The invention relates to the production of potassium manganates by oxidation of manganese compounds in an aqueous potassium hydroxide melt. More particularly, the invention relates to the production of potassium manganate (V) $K_3MnO_4$, and to the production of potassium manganate (VI) $K_2MnO_4$, by oxidation commencing with an oxidic manganese compound. The invention provides a process which renders production in such manner commercially practicable.

Prior to the invention, potassium manganate $K_2MnO_4$, has been produced for many years, and several methods of production have been devised. A large part of the potassium manganate produced is subsequently converted to potassium permanganate. Fundamentally, the reactions involved in the prior production of potassium manganate and potassium permanganate are represented by the following equations:

(1) $MnO_2 + 2KOH + \frac{1}{2}O_2 \longrightarrow K_2MnO_4 + H_2O$

(2) $K_2MnO_4 + H_2O \xrightarrow{\text{electr.}} KMnO_4 + KOH + \frac{1}{2}H_2$

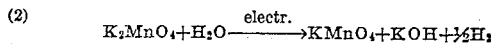

The present invention is concerned with the production of $K_2MnO_4$ according to different equations, which also involve the production of $K_3MnO_4$. The latter compound may be recovered for use as such or for production of $K_2MnO_4$ therefrom.

Of the several methods proposed for manufacturing $K_2MnO_4$, the primary commercial method apparently is the roasting method. This involves mixing hot concentrated potassium hydroxide and manganese dioxide, cooling and grinding the mixture. The concentrated potassium hydroxide starting material is produced by evaporating water from aqueous potassium hydroxide up to 385° C. Alternatively, a slurry of 50% KOH and manganese dioxide is sprayed into a hot oven, and the product is cooled and ground. The ground product is then roasted at about 225° C. with air, while intermittently spraying water on the mixture. The roasting is carried out in large rotary drums or tubes. This operation requires a very large amount of equipment, with accompanying high capital investment, power, heat, labor and maintenance requirements. Furthermore, the process is slow, inconsistent and difficult to supervise. The reaction cannot be carried to completion. This is apparently because of the difficulty in supplying sufficient water to the reactants and because sufficient potassium hydroxide cannot be supplied. As regards the former condition, the presence of water is necessary for the reaction although it does not appear on the left of the equation. The potassium hydroxide quantity is limited, because over a certain ratio to manganese dioxide, the product agglomerates seriously and prevents further oxidation.

A number of years ago, a process was devised wherein manganese dioxide was oxidized to $K_2MnO_4$ with air in a concentrated aqueous potassium hydroxide melt. Despite the potential attractiveness of such a process, it has apparently never been successfully employed on a commercial scale. This is very likely due to the fact that during the process, the mixture gets very thick or viscous, so that it is extremely difficult to disperse the oxygen sufficiently for the reaction and a very large provision of power is required in order to agitate the reaction mass at all. This thickening occurs within a period of several hours, even with a much reduced quantity of manganese dioxide in the melt.

We have now provided a process which overcomes the foregoing difficulty of the prior melt oxidation process, and in doing so, have discovered the reasons for the difficulty and have provided a solution to the problems.

We have found that, apparently, the principal source of trouble is that the manganese dioxide swells up to many times its original volume after a short period of time. Even a small excess of manganese dioxide will swell up to convert the already somewhat viscous liquid into a thick paste.

We have discovered that the key to the solution of the problem is to add a manganese oxide to an aqueous potassium hydroxide melt at a rate of addition which is not substantially greater than its rate of oxidation to a valence above 4. In the new process, an oxidic manganese compound having a manganese valence of less than 5 is oxidized to $K_3MnO_4$, wherein manganese has a valence of 5, the oxidic manganese compound being added at a rate not substantially greater than its rate of oxidation to $K_3MnO_4$.

We have further discovered that oxidation of an oxidic manganese compound having a manganese valence of less than 5, to $K_3MnO_4$ is very desirably effected by reaction with a potassium manganate having a manganese valence of greater than 5, i.e., potassium manganate (VI) or potassium permanganate. The latter decomposes to potassium manganate (VI) very quickly under the reaction conditions, according to the equation $$2KMnO_4 + 2KOH \rightarrow 2K_2MnO_4 + \frac{1}{2}O_2 + H_2O$$

In this manner, the oxidation of the manganese oxide is not dependent upon oxidation with a gas, such as air, and a favorable relatively low temperature may be employed for optimum results.

The $K_3MnO_4$ produced is further oxidized to $K_2MnO_4$. The further oxidation may take place in the same reaction zone or vessel, concomitantly with or subsequent to the oxidation of the manganese compound having a valence below 5. Preferably, the oxidation of $K_3MnO_4$ to $K_2MnO_4$ is carried out in a separate reaction zone or vessel, after removing the $K_3MnO_4$ from the first reaction zone, preferably at a rate comparable to its production.

In prior chemical studies, $K_3MnO_4$ had been produced by the following reaction carried out with powdered materials in the dry state at about 800° C.

(3) $2MnO_2 + 6KOH + \frac{1}{2}O_2 \xrightarrow[800°\ C.]{\text{dry}} 2K_3MnO_4 + 3H_2O$

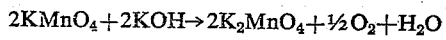

The compound had also been produced by a high temperature decomposition of $K_2MnO_4$, as follows:

(4) $2K_2MnO_4 + 2KOH \rightarrow 2K_3MnO_4 + H_2O + \frac{1}{2}O_2$

Both of these methods are technically impractical and result in an anhydrous product.

The present invention is based upon the following reactions:

(5) $MnO_2 + 4KOH + K_2MnO_4 \xrightarrow[170-310°\ C.]{KOH-H_2O\ \text{sol'n}} 2K_3MnO_4 + 2H_2O$

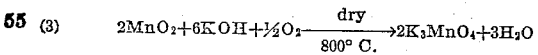
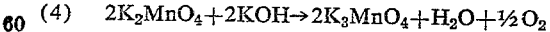

(6) $2K_3MnO_4 + \frac{1}{2}O_2 + H_2O \xrightarrow[140-310°\ C.]{KOH-H_2O\ \text{sol'n}} 2K_2MnO_4 + 2KOH$

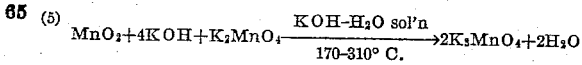
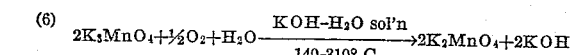

So far as known, this represents the first time a process has been based upon Equation 5, which is especially significant as employed in the production of $K_2MnO_4$. The equation represents reaction in an aqueous melt at a relatively low temperature, which provides a practical commercial process producing an aqueous product which is readily further processed, and the operating conditions, such as temperature, pressure and concentration are commercially attractive. Reaction 6 represents a very useful and economic process of manufacturing $K_2MnO_4$, starting with $K_3MnO_4$, advantageously the product of Equation 5.

Each reaction may be carried out at a favorable relatively low temperature, which is especially advantageous in materially reducing corrosion. Also, the solids and solutions are handled and processed with less difficulty, and construction, maintenance and operation of the vessels, filters, pumps and other equipment are facilitated.

Reaction 6 may take place in the same reaction zone with Reaction 5, furnishing an adequate supply of oxygen for that purpose and removing the $K_2MnO_4$, which crystallizes, as it is produced. Reaction 6 may take place while Reaction 5 occurs with the continued addition of the manganese oxide. Alternatively, Reaction 5 may be completed without substantial production of $K_2MnO_4$ according to Reaction 6, and thereafter, the $K_3MnO_4$ may be oxidized to $K_2MnO_4$ according to Reaction 6.

It is preferred in the invention to withdraw the $K_3MnO_4$ produced in Reaction 5 at a rate comparable to or approximately the same as its rate of production, and oxidize it in a separate second zone according to reaction 6. In this manner, Reaction 6 and the $K_2MnO_4$ product are not complicated by the presence of significant quantities of manganese oxide, the starting material in Reaction 5. When carrying out both reactions in one zone at the same time, unreacted manganese oxide is found in the $K_2MnO_4$ crystalline product, and such is not the case when the reactions are carried out in separate zones.

Further advantages accrue from carrying out Reactions 5 and 6 in separate zones. $K_3MnO_4$ is rapidly produced separately and in high yield, and it may be used for other purposes, for example, as an oxidizing agent. Each reaction is individually controlled, so that the manganese oxide is converted to $K_2MnO_4$ in high yield and in a successful continuous commercial process.

In certain of its broader aspects, the invention involves, then, an improvement in the production of $K_2MnO_4$ by oxidizing a manganese oxide in an aqueous potassium hydroxide melt. The improvement comprises adding manganese oxide to the melt containing a potassium manganate having a manganese valence of greater than 5, and oxidizing the manganese oxide to $K_3MnO_4$ by reaction with the potassium manganate. The preferred process also includes providing a rate of manganese oxide addition which is not substantially greater than its rate of oxidation to $K_3MnO_4$. The $K_3MnO_4$ is advantageously oxidized to $K_2MnO_4$, preferably in a separate reaction zone. The invention thus provides commercially important advantages in the production of $K_2MnO_4$ and provides a practical process for the production of $K_3MnO_4$. The prior problems are overcome, so that it is no longer necessary to carry out the much more cumbersome and expensive production of $K_2MnO_4$ by roasting. Also, the rate of production per unit volume is many times greater.

The invention contemplates the oxidation of an oxidic manganese compound wherein the manganese has a valence of less than 5. Various manganese oxides having a manganese valence of from 2 to 4, alone or in combination, pure or impure, may be employed. For example, pyrolusite containing on the order of 87% of $MnO_2$, calcined rhodochrosite, which is approximately $Mn_3O_4$, manganese oxides from permanganate reactions, e.g., $5MnO_2 \cdot K_2O \cdot 3–5H_2O$, electrolytically and chemically produced manganese oxides, manganese oxide hydrates, and manganese oxides or oxide hydrates combined with alkali metals may be employed.

Reaction 5 is carried out in an aqueous potassium hydroxide melt at a temperature of about 170° C. to 310° C., preferably about 220° C. to 260° C. The reaction rate is greater at the higher temperatures, while corrosion is reduced at the lower temperatures. Further increase in temperature is preferably avoided, to avoid possible decomposition of $K_2MnO_4$. The potassium hydroxide concentration is preferably about 65% to 90%, by weight. However, the concentration and reaction temperature may be varied.

It is also preferred that the melt contain an excess of potassium hydroxide over the theoretical molar ratio to manganese dioxide of 4:1. A considerable molar excess of potassium hydroxide is preferably employed, on the order of 30 to 60:1 or greater, which provides a melt of suitable viscosity. In this connection, it will be apparent that Equation 5 will be appropriately varied when the manganese oxide is other than manganese dioxide, and the potassium hydroxide and potassium manganate requirements will be adjusted accordingly.

The reaction proceeds with vigorous agitation while providing a potassium manganate having a manganese valence of greater than 5 in the melt. A quantity of the manganate is added initially, and further manganate is added continuously or intermittently as the reaction proceeds. The potassium manganate is very advantageously supplied by cycling part of the $K_2MnO_4$ produced by oxidation of $K_3MnO_4$. While a slight excess of the manganese oxide may be tolerated, it is preferred to continually maintain the average manganese valence in the melt at a value of at least 5, which requires that a stoichiometric amount or greater of potassium manganate (VI) or potassium permanganate be present at all times, throughout the process. It is preferred to maintain the molar ratio of $K_2MnO_4$ or $KMnO_4$ to manganese dioxide at about 1.4:1 or greater, and further preferably, at 2:1 or greater. Since $K_2MnO_4$ is relatively insoluble, it is preferable not to provide a great excess, such as will interfere with agitation and mixing.

The manganese oxide is added at a rate not substantially greater than the rate of oxidation to $K_3MnO_4$, or oxidation of the manganese to a valence of 5. The oxide may be added intermittently or continuously, care being taken that at no time is a considerable quantity of unreacted $MnO_2$ present. The rate at which the manganese oxide should be added is best determined empirically, for each set of conditions. The examples which follow are illustrative of substantially maximum rates of addition. The reaction mixture also can be analyzed from time to time for $K_3MnO_4$ content and for $MnO_2$ content, to determine the rate of oxidation, for adjusting the rate of manganese oxide addition.

While Reaction 5 advantageously does not require an oxygen-containing gas, such may be provided in intimate dispersion through the mixture for concomitant reaction according to the following equation:

(7)  $2MnO_2 + 6KOH + \frac{1}{2}O_2 \rightarrow 2K_3MnO_4 + 3H_2O$

However, Reaction 5 is apparently more rapid, so that under the defined conditions including maintaining at least a stoichiometric amount of potassium manganate having a manganese valence of greater than 5, in the melt, the production of $K_3MnO_4$ according to Reaction 7 would apparently not be so great as to render the modification important.

The reactions can be carried out in batch, semi-continuous or continuous operation. For continuous type operation, it is of course necessary to replace the potassium hydroxide consumed in Reaction 5, and this may be done at least in part by cycling the potassium hydroxide produced in the second zone by Reaction 6 and potassium hydroxide added to the second zone and subsequently withdrawn in more concentrated form, where the reactions are carried out in separate zones. The balance of the potassium hydroxide requirement may be added intermittently or continuously in the form of aqueous potassium hydroxide solution, which advantageously contains about 50% KOH, by weight, or greater. An equilibrium is reached in the melt by removal of water by evaporation, so that the KOH concentration is readily maintained between 65% and 90%.

The $K_3MnO_4$ is very soluble and remains in solution. It may be further oxidized to $K_2MnO_4$ in the same vessel, the latter being withdrawn from time to time as it crystallizes out of solution. When operating in this manner, an oxygen-containing gas must be supplied to the melt to furnish the requirements of the further oxidation. The conditions are comparable to those subsequently described for the further oxidation. It is preferred, however, to intermittently or continuously withdraw the $K_3MnO_4$ about as fast as it is produced, in its solution, and pass it to a second reaction zone. The reaction in the second zone may take place at about the same temperature.

In the second reaction zone, it is again preferred that the melt contain about 65% to 90% of potassium hydroxide, by weight. The reaction may be carried out above the solidification point of the mixture, and is preferably carried out at about 140° C. to 310° C. It is further preferred that the melt be maintained at a temperature of about 210° C. to 230° C. The melt is vigorously agitated, and air or other oxygen-containing gas is intimately mixed therewith, to provide about 4 or more times the theoretical amount of oxygen.

Air is the preferred oxygen-containing gas, for economic reasons, but oxygen, air enriched with oxygen, or a mixture of oxygen and an inert gas might be employed. The oxygen-containing gas is preferably under substantially atmospheric pressure plus any differential required to overcome the resistance to gas flow, but subatmospheric or superatmospheric pressures can be provided with appropriate adjustment of the conditions of temperature and potassium hydroxide concentration. When air is employed, it is preferred to contact the melt with a quantity equivalent to 4 or more times the theoretically required quantity of oxygen.

The $K_3MnO_4$ solution from the first reaction is intermittently or continuously introduced into the melt. It is preferred to maintain a high concentration of $K_3MnO_4$ in the melt, on the order of about 200 to 400 grams per liter, for example. The $K_3MnO_4$ is very soluble, and is therefore readily oxidized to $K_2MnO_4$ in the homogeneous solution, more readily than in the case of a heterogeneous mixture, as is the case when the further oxidation is carried out concomitantly and in the same zone with Reaction 5.

The $K_2MnO_4$ is relatively insoluble and precipitates out of the reaction mixture. It can be separated by conventional methods, such as settling and decantation, centrifugation, or filtration. The reaction can be carried out in batch, semi-continuous or continuous operation. It is preferably carried out in a continuous manner, supplying $K_2MnO_4$ solution to the reaction zone and withdrawing $K_2MnO_4$ crystals continuously or periodically as they are produced. Aqueous potassium hydroxide solution of at least 50% KOH is added to the second zone to replace the KOH withdrawn with the $K_2MnO_4$.

Carrying out the process in successive steps in the foregoing manner, conversion to $K_3MnO_4$ and to $K_2MnO_4$ approaches the quantitative. The product of the first reaction may be, for example, an aqueous potassium hydroxide solution containing about 300–350 grams of $K_3MnO_4$ per liter. The product of Reaction 6 initially contains adherent mother liquor, containing $K_3MnO_4$, potassium hydroxide and water. After washing, the crystals contain about 80% to 90% of $K_2MnO_4$, potassium hydroxide, water, and minor impurities. The $K_3MnO_4$ is removed by washing and returned to the process, so that the yield of $K_2MnO_4$ is practically quantitative.

Reactions 5 and 6 may be carried out in conventional apparatus, such as a vat or vats equipped with suitable means of agitation and means for dispersing air throughout the batch. Provision is made for introducing the reagents and for withdrawing the products. In the preferred process, $K_3MnO_4$ and $K_2MnO_4$ are produced continuously or semi-continuously, in the manner illustrated schematically in the attached drawing.

An aqueous potassium hydroxide melt is provided in a vessel 1, and initial quantities of manganese oxide and $K_2MnO_4$ or $KMnO_4$ are added to the melt. Agitation is provided, and the manganese oxide and potassium manganate are added from time to time or continuously. Makeup aqueous potassium hydroxide is also added, according to its consumption. Baffle means schematically illustrated by a baffle 2 is provided in the vessel 1, between the inlets and outlet for the materials entering and leaving the vessel.

As the production of $K_3MnO_4$ proceeds, the solution may be allowed to overflow through a conduit 3 into a second reaction vessel 4, thus favorably affecting the reaction equilibrium in vessel 1, and supplying the initial material for the oxidation in the second vessel 4. An aqueous potassium hydroxide melt is provided in the second vessel 4, and the vessel is supplied with means for introduction of air and heat, and for agitation. Aqueous potassium hydroxide solution of 50% concentration or greater is supplied to the second vessel 4 from time to time, to replace material withdrawn, and it becomes concentrated by evaporation. $K_2MnO_4$ crystallizes in the second vessel and may be withdrawn in the form of a slurry and filtered by a filter 5. The filtrate is recycled to the second vessel through a conduit 6, to return $K_3MnO_4$ and KOH to the process. Filter cake washes preferably are used as makeup KOH solution supplied to the second vessel.

Part of the $K_2MnO_4$ slurry removed from the second vessel 4 is preferably cycled directly to the first vessel 1, through a conduit 7, without filtering. This material serves for the reaction in the first vessel 1, supplying both the $K_2MnO_4$ and KOH requirements. In continuous type operation, it preferably corresponds to about two-thirds of the $K_2MnO_4$ withdrawn from the second vessel 4. Of the $K_2MnO$ cycled to the first vessel, about one-half takes part in the reaction, and the remainder constitutes an excess and is continuously cycled between the first and second vessels.

The manganese oxide in the first vessel is substantially prevented from entering the second vessel 4 by the baffle 2 and also owing to a relatively small flow rate. The rate of flow is such that the average residence or retention time for each particle is greater than the reaction time for the manganese oxide. The average residence time may be, for example, from 1 to 3 hours, while the oxidation of the manganese oxide may require about 15 to 20 minutes or less, as subsequently exemplified. Consequently, at most a very small amount of the oxide reaches the second vessel 4. In the second vessel, the average residence time may be about 1 to 2 hours, during which the small quantity of manganese oxide may be oxidized. The result is that very little if any unreacted manganese oxide will appear in the $K_2MnO_4$ product.

An advantage of the process is that the heat requirements may be supplied entirely to one vessel, the second vessel 4. With the relatively low temperatures involved, the thermal efficiency can be very high. The initial potassium hydroxide melt for both vessels may be prepared in the second vessel by evaporating water from 50% KOH solution.

As the reactions proceed, heat is supplied to the second vessel, concentrating the additional 50% potassium hydroxide solution subsequently added and furnishing the heat required to maintain the reaction temperature. The hot $K_2MnO_4$ slurry cycled from the second vessel 4 to the first vessel 1 supplies the heat necessary to maintain the reaction temperature in the latter vessel, the first vessel then operating at a slightly lower temperature.

A number of additional advantages flow from the new process, which is now eminently suited for commercial operation. The process can be carried out in batch or continuous type operation, in either one or two vats, to produce large quantities of $K_3MnO_4$ and $K_2MnO_4$. The simple and inexpensive equipment is substituted for an entire series of roasters, having the aforementioned disadvantages. The products are obtained in a state of high purity. The dust problem of roasting is eliminated. Operational time is greatly reduced and a much more efficient process is provided. The requirements of air or other oxygen-containing gas are considerably reduced, and an accompanying advantage is that correspondingly less carbonate is formed by absorption of carbon dioxide from the air. The air dispersion is much more intimate, and the reactions are improved correspondingly. Each of the melts stir very well, so that the power requirement is low, as is the wear on the stirring apparatus.

The following examples are furnished to assist in providing a complete understanding of the invention, but it is to be understood that the invention is not limited thereto nor to the quantities, materials, conditions and procedures illustrated therein, which are merely illustrative.

Example 1

Aqueous potassium hydroxide is evaporated to produce 80% KOH having a volume of 4 liters. The solution is maintained at 220° C., and 500 grams of $K_2MnO_4$ or 400 grams of $KMnO_4$ are added initially. 100 grams of pyrolusite (87% $MnO_2$) are added and allowed to react for about 15 minutes, while agitating the mixture. Then, 200 grams of $K_2MnO_4$ and 100 grams of pyrolusite are added and allowed to react for 15 minutes, three successive times.

About 15 minutes after the last addition, $K_3MnO_4$ is produced in a yield of about 98%, based on $MnO_2$. The product of the oxidation reaction is an aqueous potassium hydroxide solution containing about 15% of $K_3MnO_4$, by weight.

Example 2

150 liters of an 80% potassium hydroxide solution containing 300 grams of $K_3MnO_4$ per liter are placed in a reaction vessel equipped with an efficient agitator and provided with means for introducing air. The solution may be prepared according to Example 1 or according to the succeeding examples. The solution or melt is maintained at a temperature of 225° C.

The mixture is agitated vigorously, and in excess of four times the theoretical quantity of oxygen in the form of air is intimately mixed therewith. Intimate mixture is obtained by violent agitation while introducing air over the mixture, so as to intimately disperse fine bubbles of air in the suspension. Alternatively, air is introduced through a tube directly into the mixture.

Oxidation proceeds at the rate of about 2 grams of $K_3MnO_4$ per liter per minute. The $K_3MnO_4$ consumed is continuously replaced, as with the solution from Example 1. $K_2MnO_4$ crystallizes out of the reaction mixture, is withdrawn from time to time in the form of a slurry in potassium hydroxide solution, and is separated from the mother liquor by filtration. Part of the slurry may be used in the method of Example 1, for the production of additional $K_3MnO_4$. Makeup potassium hydroxide solution of 50% strength or greater is added to the vessel.

The filter cake of $K_2MnO_4$ is washed with 60% aqueous potassium hydroxide solution at 100° C., and the liquid is removed from the cake by suction. The filtrate is recycled to the reaction vessel wherein the $K_2MnO_4$ is produced, and the washes are employed as the above makeup solution.

The product after washing and application of suction to remove the liquor contains 82% to 90% of $K_2MnO_4$, some potassium hydroxide, water, and minor impurities. The yield based on $K_3MnO_4$ is practically quantitative.

Example 3

The procedure of Example 1 is repeated, except that an 85% KOH melt is maintained at a temperature of about 300° C. The reaction periods are reduced from 15 minutes to about 2 minutes. The $K_3MnO_4$ product solution is substantially the same.

Example 4

The procedure of Example 1 is repeated, except that 100 grams of calcined rhodochrosite are employed for each addition instead of 100 grams of pyrolusite. The remaining conditions are the same, except that the reaction time is about 20 minutes instead of 15 minutes. The product is substantially the same.

Example 5

50 gallons of 80% aqueous potassium hydroxide are maintained at 220° C. In the manner of Example 1, 60 pounds of $K_2MnO_4$ or 50 pounds of $KMnO_4$ are added. 10 pounds of pyrolusite are added and allowed to react for about 15 minutes. Thereafter, three successive additions of 20 pounds of $K_2MnO_4$ and 10 pounds of pyrolusite are made, with reaction intervals of 15 minutes. The product and yield are substantially the same as in Example 1.

The invention thus provides a new process for producing $K_3MnO_4$ and for producing $K_2MnO_4$, which constitutes a substantial improvement over the prior methods and overcomes their disadvantages. A manganese oxide is very advantageously oxidized by reaction with a potassium manganate having a manganese valence of greater than 5. A major characteristic of the process is that the manganese oxide is added at a rate which is not substantially greater than its rate of oxidation to $K_3MnO_4$. When this important condition is not observed, and the manganese oxide is added substantially more rapidly than it is oxidized, the excess oxide in the suspension swells up, prevents adequate agitation and proper mixing, so that it is very difficult to carry out the reaction. The addition of the manganese oxide according to the invention also takes advantage of the reaction rate and provides a successful continuous process. The manganese dioxide is substantially consumed, so that the $K_3MnO_4$ solution conveyed to the second reaction zone for production of $K_2MnO_4$, contains an insubstantial quantity of manganese dioxide, avoiding contamination of the $K_2MnO_4$ product.

The process of the invention is rapid and reliable, and produces high quality products in high yields. The consumption of materials is a minimum, and the operation is carried out in but a small equipment installation with low investment, power, heat, labor and maintenance requirements. The invention provides a very advantageous solution to the problem of oxidizing a manganese oxide in an aqueous melt, rendering the process suitable for large scale commercial operation.

The invention is hereby claimed as follows:

1. In a process for producing $K_2MnO_4$ by oxidizing a manganese oxide having a manganese valence of less than 5 in a hot aqueous potassium hydroxide solution, the improvement which comprises adding said manganese oxide to said solution containing a potassium manganate having a manganese valence of greater than 5, oxidizing said manganese oxide to $K_3MnO_4$ by reaction with said potassium manganate, the rate of said manganese oxide addition being not substantially greater than its rate of oxidation to $K_3MnO_4$, and oxidizing the $K_3MnO_4$ produced to $K_2MnO_4$.

2. In a process for producing $K_2MnO_4$ by oxidizing a manganese oxide having a manganese valence of less than 5 in a hot aqueous potassium hydroxide solution, the improvement which comprises adding said manganese oxide to said solution containing a potassium manganate having a manganese valence of greater than 5, oxidizing said manganese oxide to $K_3MnO_4$ by reaction with said potassium manganate, maintaining the average manganese valence in said solution at a value of at least 5, the rate of said manganese oxide addition being not substantially greater than its rate of oxidation to $K_3MnO_4$, and oxidizing the $K_3MnO_4$ produced to $K_2MnO_4$.

3. In a process for producing $K_2MnO_4$ by oxidizing a manganese oxide having a manganese valence of less than 5 in a hot aqueous potassium hydroxide solution, the improvement which comprises adding said manganese oxide to said solution containing a potassium manganate having a manganese valence of greater than 5, oxidizing said manganese oxide to $K_3MnO_4$ by reaction with said potassium manganate, the rate of said manganese oxide addition being not substantially greater than its rate of oxidation to $K_3MnO_4$, removing the $K_3MnO_4$ produced, and oxidizing the $K_3MnO_4$ removed to $K_2MnO_4$ in a separate reaction zone.

4. In a process for producing $K_2MnO_4$ by oxidizing a manganese oxide having a manganese valence of less than 5 in a hot aqueous potassium hydroxide solution, the improvement which comprises providing an aqueous about 65% to 90% potassium hydroxide solution and maintaining it at a temperature of about 220° C. to 260° C., adding said manganese oxide to said solution containing a potassium manganate having a manganese valence of greater than 5, oxidizing said manganese oxide to $K_3MnO_4$ by reaction with said potassium manganate, the rate of said manganese oxide addition being not substantially greater than its rate of oxidation to $K_3MnO_4$, removing the $K_3MnO_4$ produced, and oxidizing the $K_3MnO_4$ removed to $K_2MnO_4$ in an aqueous about 65% to 90% potassium hydroxide solution maintained at a temperature of about 210° C. to 230° C. in a separate reaction zone.

5. In a process for producing $K_2MnO_4$ by oxidizing manganese dioxide in a hot aqueous potassium hydroxide solution, the improvement which comprises adding said manganese oxide to said solution containing an excess of a potassium manganate having a manganese valence of greater than 5, oxidizing said manganese dioxide to $K_3MnO_4$ by reaction with said potassium manganate, the rate of said manganese dioxide addition being not substantially greater than its rate of oxidation to $K_3MnO_4$, removing the $K_3MnO_4$ produced, and oxidizing the $K_3MnO_4$ removed to $K_2MnO_4$ in a separate reaction zone.

6. In a process for producing $K_2MnO_4$ by oxidizing manganese dioxide in a hot aqueous potassium hydroxide solution, the improvement which comprises providing an aqueous about 65% to 90% potassium hydroxide solution and maintaining it at a temperature of about 220° C. to 260° C., adding said manganese dioxide to said solution containing a potassium manganate having a manganese valence of greater than 5, oxidizing said manganese dioxide to $K_3MnO_4$ by reaction with said potassium manganate, maintaining the molar ratio of said potassium manganate to manganese dioxide in said solution at a value of at least about 1.4:1, the rate of said manganese dioxide addition being not substantially greater than its rate of oxidation to $K_3MnO_4$, removing the $K_3MnO_4$ produced, and oxidizing the $K_3MnO_4$ removed to $K_2MnO_4$ in an aqueous about 65% to 90% potassium hydroxide solution maintained at a temperature of about 210° C. to 230° C. in a separate reaction zone.

7. The process for producing $K_2MnO_4$ which comprises adding a manganese oxide having a valence of less than 5 to a hot aqueous about 65% to 90% potassium hydroxide solution at a temperature of about 170° C. to 310° C., providing a potassium manganate having a manganese valence of greater than 5 in said solution, oxidizing said manganese oxide to $K_3MnO_4$ by reaction with said potassium manganate, the rate of said manganese oxide addition being not substantially greater than its rate of oxidation to $K_3MnO_4$, removing the $K_3MnO_4$ produced, and oxidizing the $K_3MnO_4$ removed to $K_2MnO_4$ in a separate reaction zone by intimately mixing an oxygen-containing gas with an aqueous about 65% to 90% potassium hydroxide solution of the former at a temperature of about 140° C. to about 310° C.

8. The process which comprises adding a manganese oxide having a manganese valence of less than 5 to a hot aqueous potassium hydroxide solution containing a potassium manganate having a manganese valence of greater than 5, and oxidizing said manganese oxide to $K_3MnO_4$ by reaction with said potassium manganate, the rate of said manganese oxide addition being not substantially greater than its rate of oxidation to $K_3MnO_4$.

9. The process which comprises adding a manganese oxide having a manganese valence of less than 5 to a hot aqueous potassium hydroxide solution containing a potassium manganate having a manganese valence of greater than 5, oxidizing said manganese oxide to $K_3MnO_4$ by reaction with said potassium manganate, the rate of said manganese oxide addition being not substantially greater than its rate of oxidation to $K_3MnO_4$, and removing the $K_3MnO_4$ produced.

10. The process which comprises adding a manganese oxide having a manganese valence of less than 5 to a hot aqueous about 65% to 90% potassium hydroxide solution containing a potassium manganate having a manganese valence of greater than 5, maintaining said solution at a temperature of about 170° C. to 310° C., and oxidizing said manganese oxide to $K_3MnO_4$ by reaction with said potassium manganate, the rate of said manganese oxide addition being not substantially greated than its rate of oxidation to $K_3MnO_4$.

11. The process which comprises adding manganese dioxide to a hot aqueous potassium hydroxide solution containing a potassium manganate having a manganese valence of greater than 5, maintaining an excess of said potassium manganate in said solution, and oxidizing said manganese dioxide to $K_3MnO_4$ by reaction with said potassium manganate, the rate of said manganese dioxide addition being not substantially greater than its rate of oxidation to $K_3MnO_4$.

12. The process which comprises adding manganese dioxide to a hot aqueous about 65% to 90% potassium hydroxide solution containing a potassium manganate having a manganese valence of greater than 5, maintaining said solution at a temperature of about 220° C. to 260° C., maintaining the molar ratio of said potassium manganate to manganese dioxide in said solution at a value of at least about 1.4:1, and oxidizing said manganese dioxide to $K_3MnO_4$ by reaction with said potassium manganate, the rate of said manganese dioxide addition being not substantially greater than its rate of oxidation to $K_3MnO_4$.

13. In a process for producing a potassium manganate by oxidizing a manganese oxide having a valence of less than 5 in a hot aqueous potassium hydroxide solution, the improvement which comprises continually maintaining in the solution a quantity of potassium manganate having a manganese valence of greater than 5 which is at least about stoichiometrically equivalent to the quantity of said manganese oxide in the solution.

14. In a process for producing a potassium manganate by oxidizing a manganese oxide having a valence of less than 5 in a hot aqueous potassium hydroxide solution, the improvement which comprises initially providing in the solution a quantity of potassium manganate having a manganese valence of greater than 5, adding said manganese oxide to the solution, and continually maintaining in the solution a quantity of said potassium manganate which is at least about stoichiometrically equivalent to the quantity of said manganese oxide in the solution.

References Cited in the file of this patent

UNITED STATES PATENTS 1,826,594     Bellone _____ Oct. 6, 1931

OTHER REFERENCES

Scholder et al.: "Zeitschrift für anorganische und allgemeine Chemie," Band 277 (1954), pages 243–245.